UNITED STATES PATENT OFFICE.

CHRISTOPHER RIS, OF BASLE, SWITZERLAND, ASSIGNOR TO JOHN R. GEIGY & CO., OF SAME PLACE.

YELLOW DYE AND PROCESS OF MAKING SAME.

SPECIFICATION forming part of Letters Patent No. 613,911, dated November 8, 1898.

Application filed March 4, 1898. Serial No. 672,595. (Specimens.)

*To all whom it may concern:*

Be it known that I, CHRISTOPHER RIS, of Basle, in the Republic of Switzerland, have invented a new and useful Improvement in Coloring-Matters, of which the following is a specification.

This invention (for which Letters-Patent have been applied for in Germany, No. 11,724, dated August 17, 1897; in France, No. 269,466, dated August 9, 1897, and in England, dated August 17, 1897) refers to the production of a new yellow coloring-matter dyeing unmordanted cotton, wool, and silk in fast greenish-yellow shades and which is produced by condensation of paradinitrodibenzyldisulfo-acid with a base of the series of anilin—such as anilin, toluidins, xylidins, cumidins. The reaction is carried out in presence of caustic alkali lye. The color which is produced with, for instance, anilin possesses probably the following or a similar formula:

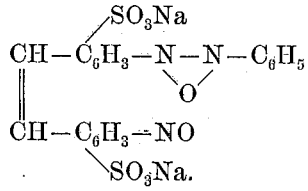

It forms an orange-yellow powder easily soluble in water with yellow color, scarcely soluble in alcohol, soluble in concentrated sulfuric acid with orange color. By means of reducing agents, such as powder of zinc and hydrochloric acid, it is split into diamidostilbenedisulfo-acid and the base used of the anilin series. By further oxidation in alkaline solution with, for instance, hypochlorite of sodium or persulfate of ammonia it turns into more greenish and pure shades without changing the other properties.

Example: Twenty-four kilos of paradinitrodibenzyldisulfonate of sodium are dissolved in about three hundred liters of hot water. Then five kilos of anilin and fifty kilos of caustic soda-lye of 40° Baumé are added. Then the mass is stirred for about one hour at 70° to 80° centigrade. Then the excess of soda-lye is neutralized with hydrochloric acid, the coloring-matter salted out, filtered off, and pressed. Then it is redissolved in about three hundred liters of hot water mixed with a solution of six kilos of hypochlorite of sodium in about two hundred liters of water and then stirred for about half an hour at a temperature of 60° to 80° centigrade. Finally the coloring-matter is salted out, filtered off, pressed, and dried.

I claim—

1. The new process for the production of yellow coloring-matter by condensation of paradinitrodibenzyldisulfo-acid with a base of the anilin series in presence of caustic alkali lye and then further oxidation of the product substantially as described.

2. The new coloring-matter thus obtained, which forms an orange-yellow powder, easily soluble in water with yellow color, scarcely soluble in alcohol, soluble in concentrated sulfuric acid with orange color, which is split by means of reduction into diamidostilbenedisulfo-acid and the base used of the anilin series, and which possesses probably the following or a similar formula:

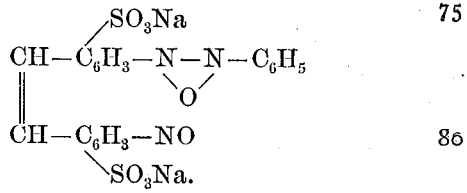

In testimony that I claim the foregoing as my invention I have signed my name in presence of two subscribing witnesses.

CHRISTOPHER RIS.

Witnesses:
GEORGE GIFFORD,
CHARLES A. RICHTER.